UNITED STATES PATENT OFFICE.

JAMES FULLEN, OF YONKERS, NEW YORK, ASSIGNOR TO MARGARET V. FULLEN, OF SAME PLACE.

IMPROVED MODE OF TREATING WOOL FOR REMOVAL OF BURRS, &c.

Specification forming part of Letters Patent No. 43,547, dated July 12, 1864.

*To all whom it may concern:*

Be it known that I, JAMES FULLEN, a resident of Yonkers, in the county of Westchester and State of New York, have made a new and useful invention having reference to the treatment of wool for the removal of burrs therefrom; and I do hereby declare the same to be fully described in the following specification.

My present invention is an improvement on the process for which Letters Patent No. 40,832 of United States Patents were granted to me on the 8th day of December, 1863, and consequently I do not herein claim the treatment or process so patented.

The nature of my improvement consists in treating the wool with two acid solutions of different strengths preparatory to subjecting it to the action of the compound solution of soda-ash or alkali and Irish moss; also, in the employment of the picker at the final stage of the process, or after the wool having the burrs in it may have been otherwise treated, as hereinafter explained.

In carrying out my invention, the wool charged with the burrs or foreign matters should first be steeped for about fifteen minutes in an aqueous solution of sulphuric acid of a density indicated by 16°, or thereabout, of Twaddell's hydrometer. Next the wool should be removed from the solution, and while wet therewith should be immersed in a second and weaker aqueous solution of sulphuric acid of the strength indicated by 6°, or thereabout, of Twaddell's hydrometer, where it may be suffered to remain for a period of ten minutes, more or less. Afterward the wool should be removed from the solution and dried in and by the air, or by artificial means; and after it may have become dry, or very nearly so, it should be immersed for about a quarter of an hour in a compound solution of soda-ash and Irish moss, the proportions of the moss and soda-ash to fifty gallons of water being twenty pounds of the alkali and two pounds of the moss. Next the wool should be removed from the compound solution of alkali and moss, and be well rinsed in water, so as to thoroughly wash it, after which it should be allowed to dry or should be dried, when it will be ready for treatment by the picker—or, in other words, a wool-picker—to the action of which it should finally be subjected in order to break up the burrs and separate them from the wool.

I have found that with but one immersion of the wool in the acid solution, and subsequently allowing the wool to dry, the staple of the wool will be injured; but when prior to being suffered to dry the wool is immersed in or subjected to a weaker solution of the acid, as above described, it will not, when dry, be found to be injured. The stronger solution should not be allowed to dry in the wool, otherwise it will detract from it more or less of the strength of the fiber. I have also discovered that it is better to subject the wool to the action of the wool-picker after rather than before the compound solution of alkali and moss may have been applied to it and the wool may have been washed and dried, for the wool, under such circumstances, will be found to have been opened to better advantage and to be in a much better state for being either felted or manufactured into yarns or other fabrics than is the case when it is picked by the picker preparatory to being subjected to the compound solution of alkali and moss.

I therefore claim as an improvement on the process heretofore patented by me, as hereinbefore mentioned—

1. The treating of the wool with the two acid solutions of different densities, substantially as hereinbefore specified, preparatory to its being subjected to the compound solution of soda-ash and Irish moss.

2. The employment of the picker at the final stage of the process, or after the wool with the burrs in it may have been otherwise treated, as hereinbefore explained.

JAMES FULLEN.

Witnesses:
R. H. EDDY,
F. P. HALE, Jr.